(12) United States Patent
Hwang et al.

(10) Patent No.: US 8,059,508 B2
(45) Date of Patent: Nov. 15, 2011

(54) HOLOGRAPHIC INFORMATION STORAGE MEDIUM, AND APPARATUS AND METHOD FOR INSPECTING DEFECT THEREOF

(75) Inventors: Sung-hee Hwang, Suwon-si (KR); Taek-seong Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 402 days.

(21) Appl. No.: 12/199,151

(22) Filed: Aug. 27, 2008

(65) Prior Publication Data

US 2009/0180367 A1 Jul. 16, 2009

(30) Foreign Application Priority Data

Jan. 10, 2008 (KR) .................. 10-2008-0002927

(51) Int. Cl.
*G11B 20/18* (2006.01)
(52) U.S. Cl. ............ 369/53.17; 369/53.12; 369/53.13; 369/53.15; 369/53.16; 369/103
(58) Field of Classification Search .................. None
See application file for complete search history.

(56) References Cited

U.S. PATENT DOCUMENTS

| | | | | |
|---|---|---|---|---|
| 6,011,762 A | * | 1/2000 | Watanabe et al. | 369/44.27 |
| 6,298,019 B1 | * | 10/2001 | Watanabe et al. | 369/44.27 |
| RE40,946 E | * | 10/2009 | Watanabe et al. | 369/44.27 |
| 2003/0197906 A1 | * | 10/2003 | Furuta et al. | 359/15 |
| 2005/0018583 A1 | * | 1/2005 | Worthington et al. | 369/103 |
| 2007/0189138 A1 | * | 8/2007 | Kuroda et al. | 369/47.51 |
| 2007/0258344 A1 | * | 11/2007 | Rogers et al. | 369/112.01 |
| 2008/0019224 A1 | * | 1/2008 | Ishibashi | 369/30.03 |

FOREIGN PATENT DOCUMENTS

| | | |
|---|---|---|
| JP | 2005-129094 | 5/2005 |
| JP | 2007-035123 | 2/2007 |
| WO | WO 2005/066941 | 7/2005 |

OTHER PUBLICATIONS

International Search Report and Written Opinion of the International Searching Authority issued on Mar. 27, 2009, in counterpart International Application No. PCT/KR2008/005360 (10 pages).

* cited by examiner

*Primary Examiner* — Joseph Feild
*Assistant Examiner* — Huy D Nguyen
(74) *Attorney, Agent, or Firm* — NSIP Law

(57) ABSTRACT

A defect entry, including position information of a defective block of a reference information layer and state information indicating the defective state of blocks of the other information layers located adjacent to a perpendicular direction at a position of the defective block of the reference information layer, is recorded on a holographic information storage medium. A method of inspecting for a defect includes determining whether blocks in a reference information layer are defective, and determining whether blocks of the other information layers located adjacent to a perpendicular direction at a position of a defective block of the reference information layer are defective, based on a result of the defect determination of the reference information layer.

23 Claims, 7 Drawing Sheets

| STATE INFORMATION | | | | | | | |
|---|---|---|---|---|---|---|---|
| 1 | 0 | 0 | 0 | ⋯ | 0 | 0 | 0 |
| 1 | 1 | 0 | 0 | ⋯ | 0 | 0 | 0 |
| 1 | 1 | 1 | 0 | ⋯ | 0 | 0 | 0 |
| 1 | 1 | 1 | 0 | ⋯ | 0 | 0 | 1 |
| 1 | 1 | 1 | 0 | ⋯ | 0 | 1 | 1 |
| ⋮ | | | | | | | |
| 1 | 1 | 1 | 1 | ⋯ | 1 | 1 | 1 |

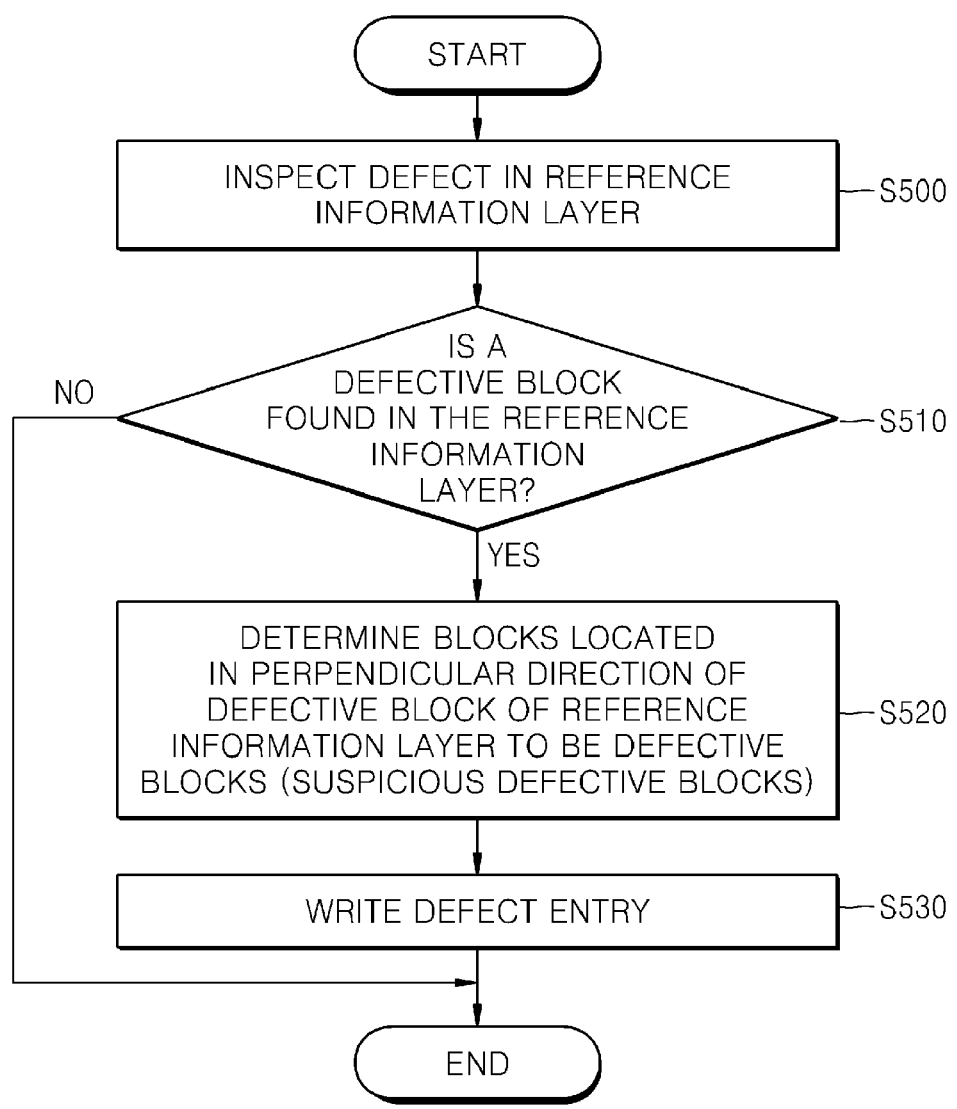

HOLOGRAPHIC INFORMATION STORAGE MEDIUM, AND APPARATUS AND METHOD FOR INSPECTING DEFECT THEREOF

CROSS-REFERENCE TO RELATED APPLICATION

This application claims the benefit of Korean Patent Application No. 2008-2927 filed on Jan. 10, 2008, in the Korean Intellectual Property Office, the disclosure of which is incorporated herein by reference.

BACKGROUND OF THE INVENTION

1. Field of the Invention

Aspects of the present invention relate to a holographic information storage medium, and an apparatus and method for inspecting a defect thereof.

2. Description of the Related Art

Recently, information storage technology using holography has drawn wide attention. According to a holographic information storage method, information is stored in an inorganic crystal or a photopolymer material sensitive to light in form of an optical interference pattern. The optical interference pattern is formed using two laser beams exhibiting interference. That is, an interference pattern, formed as a reference light and a signal light which have different paths and interfere with each other, is recorded by generating a chemical or physical change on a photosensitive storage medium. In order to reproduce information from the recorded interference pattern, the reference light similar to the recording light is illuminated on the interference pattern recorded on the storage medium. The interference pattern creates a diffraction of the illuminated light so that the signal light is restored and the information is reproduced.

The holographic information storage technology includes a volume holographic method for recording/reproducing information in units of page using volume holography and a micro-holographic method for recording/reproducing information in a single bit using micro-holography. Although the volume holography method has an advantage in processing a large amount of information at the same time, since an optical system needs to be very precisely adjusted, the volume holography method is difficult to commercialize for an information storage apparatus for general consumers.

In the micro-holographic method, a fine interference pattern is formed by allowing two focused lights to interfere with each other at a focal point and a plurality of interference patterns by moving the focal points of the two focused lights on a plane in a storage medium, thus recording information on a recording layer. Furthermore, since the recording layer formed of a photosensitive material such as photopolymer where the interference pattern is recorded has a predetermined thickness and information layers where information is recorded are formed in a depth direction of the recording layer, the information can be recorded in three dimensions. As the information is recorded in a plurality of the information layers in the recording layer, an area where a light beam passing through an objective lens meets a surface of the storage medium, that is, a spot area, varies according to the information layer where recording is performed. When the number of the information layers is 4, 8, or 16, a difference between the minimum area and the maximum area where the light beam meets the surface of the storage medium increases. Accordingly, an effect by dust having the same size on the surface of the different storage medium varies according to the number of information layers and a degree of the variation increases as the number of the information layers increases.

Thus, a method to remove the effect (error) created by the dust for each information layer of the storage medium is needed.

FIG. 1 illustrates a storage medium used in a micro-holographic method in which information is recorded in multiple layers of such storage medium. Referring to FIG. 1, a reference light L1 and a signal light L2, respectively, pass through first and second objective lenses OL1 and OL2 and form a focal point F on a recording layer 12 of a holographic information storage medium 10. Information is recorded in the form of a hologram 13 due to the interference between the reference light L1 and the signal light L2 at a position where the focal point F is formed. The information recorded by the hologram 13 forms an information layer IL at the same depth from the surface of a storage medium 10. As the depth of the focal point F of the reference light L1 and the signal light L2 varies, multiple information layers IL are formed at different depths from the surface of the storage medium 10. The distance from the surfaces of the first and second protective layers 11 and 19, covering both sides of the recording layer 12, to each information layer IL is referred to as the cover layer thickness. In the present example, since the storage medium 10 is a dual side incident type, the cover layer thickness can be defined based on a surface on which the reference light L1 is incident or a surface on which the signal light L2 is incident.

FIG. 2 illustrates spot areas in each information layer inside the recording layer according to the different thicknesses of the cover layer. In FIG. 2, the cover layer thickness is defined based on the surface on which the reference light L1 is incident. Referring to FIG. 2, the cover layer thickness is different for each information layer and accordingly the spot area that is an area where the reference light L1 meets the surface of the first protective layer 11 is different for each information layer IL. For example, when a first cover layer thickness T1 for a first information layer IL1 is smaller than a second cover layer thickness T2 for a second information layer IL2, a first spot area S1 formed by the reference light L1 having a focal point formed on the first information layer IL1 is smaller than a second spot area S2 formed by the reference light L1 having a focal point formed on the second information layer IL2.

When an incident/reflected beam is blocked by defects such as dust, fingerprints, scratches, or bubbles, since the spot area formed on the surface of the storage medium varies for each information layer, the amount of the light reflected by a defect generated on the surface of the storage medium varies for each information layer. That is, the amount of reflected light is proportional to the difference between the spot area and the area where incident/reflected light is blocked by a defect. This is because the spot area varies according to the cover layer thickness for each information layer while "the area where incident/reflected light is blocked by a defect" is constant for each information layer with respect to the same defect on the surface of the storage medium. In general, when the amount of reflected light is less than a certain level, a detection system detects an error. Accordingly, for a defect of the same size, an error is detected in a certain layer and an error is not detected in another layer. Thus, in spite of the fact that each information layer is affected differently by the same defect, a method for inspecting a defect in a holographic information storage medium inspects the overall area of the recording layer and determines whether there is a defect. As described above, since the overall area of the recording layer is inspected, a lot of time is spent inspecting for a defect. Also, even in the middle of recording, a defect inspection operation is performed, thus consuming much time.

SUMMARY OF THE INVENTION

Several aspects and example embodiments of the present invention provide a holographic information storage medium which can reduce deterioration of reliability of data or reduction of storage capacity due to different signal quality for each layer in a multilayer information storage medium, and an apparatus and method for inspecting a defect.

Additional aspects and/or advantages of the invention will be set forth in part in the description which follows and, in part, will be obvious from the description, or may be learned by practice of the invention.

According to an aspect of the present invention, there is provided a holographic information storage medium in which an information layer where information is recorded, using a hologram due to the interference between a reference light and a signal light is formed in multiple layers, in a direction along the depth of the information layer. A defect entry, including position information of a defective block of a reference information layer and state information indicating the defective state of blocks of the other information layers located in a perpendicular direction of the defective block of the reference information layer, is recorded in the holographic information storage medium.

According to another aspect of the present invention, the blocks of the other information layers are blocks through which light passes for recording/reproducing the reference information layer.

According to another aspect of the present invention, the state information indicates whether the blocks of the other information layers, located in a perpendicular direction to the defective block of the reference information layer, are defective blocks or not.

According to another aspect of the present invention, the state information indicates whether the blocks of the other information layers, located in a perpendicular direction to the defective block of the reference information layer, are likely to be defective blocks.

According to another aspect of the present invention, the state information indicates the defective state for all blocks of the other information layers located in a perpendicular direction to the defective block of the reference information layer.

According to another aspect of the present invention, a defect inspection apparatus for recording/reproducing information in a holographic information storage medium having multiple layers includes a control portion determining whether blocks in a reference information layer are defective and whether blocks of the other information layers, located in a perpendicular direction to a defective block of the reference information layer, are defective.

According to another aspect of the present invention, a method for inspecting a defect on a holographic information storage medium including multiple layers includes determining whether blocks in a reference information layer are defective, and determining whether blocks of the other information layers located in a perpendicular direction to a defective block of the reference information layer are defective, based on the determination of the reference information layer.

According to another aspect of the above holographic information storage medium, and an apparatus and method for inspecting a defect, not only the time for defect inspection is reduced, but also highly reliable data can be provided to a user by preventing recording information on a defective block or a suspicious defective block by using the defect entry.

In addition to the example embodiments and aspects as described above, further aspects and embodiments will be apparent by reference to the drawings and by study of the following descriptions.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

FIG. 9 is a flow chart for explaining the process of a method for inspecting a defect of a holographic information storage medium according to an example embodiment of the present invention.

DETAILED DESCRIPTION OF THE EMBODIMENTS

Figure 1:
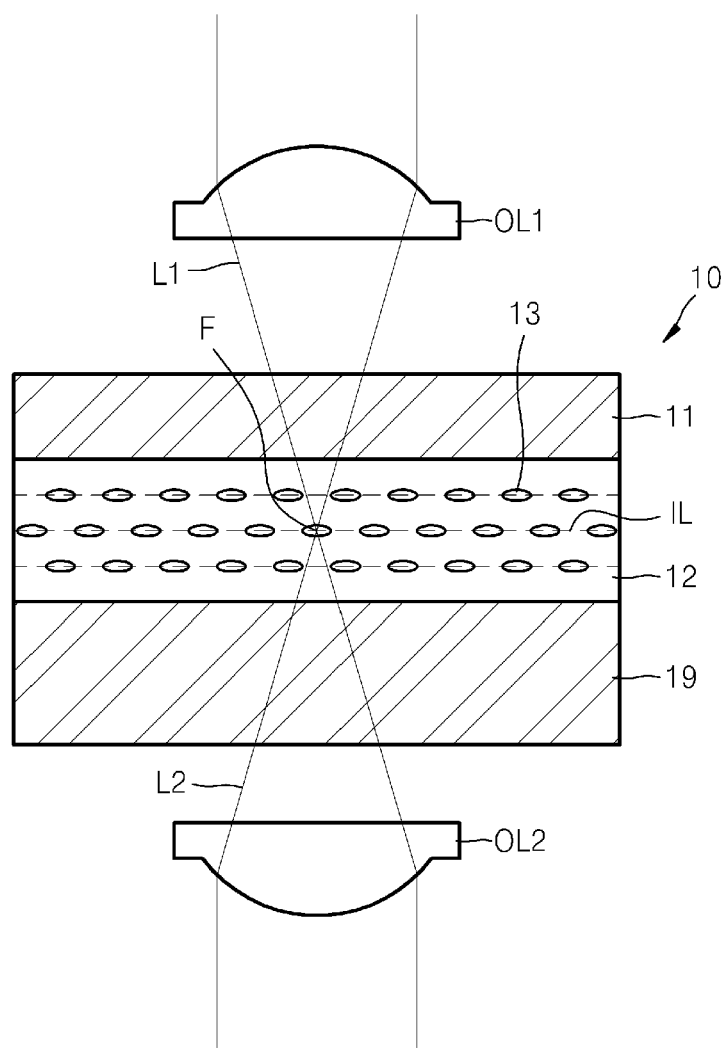
FIG. 1 illustrates the optical structure of a holographic information storage medium where information is recorded.
Figure 2:
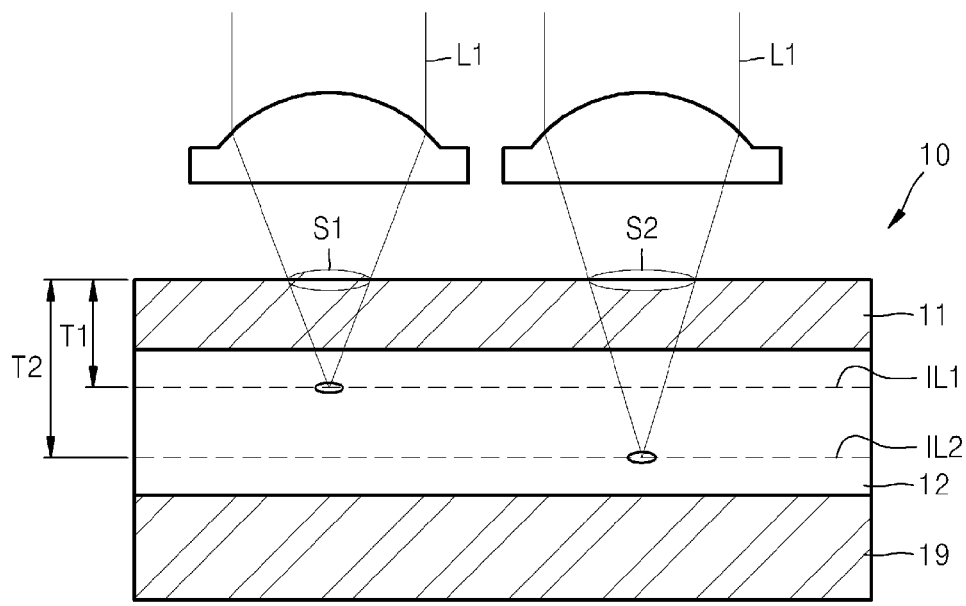
FIG. 2 is a reference view for explaining differences of spot areas for each information layer according to the difference in the cover layer thickness in FIG. 1.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 3:
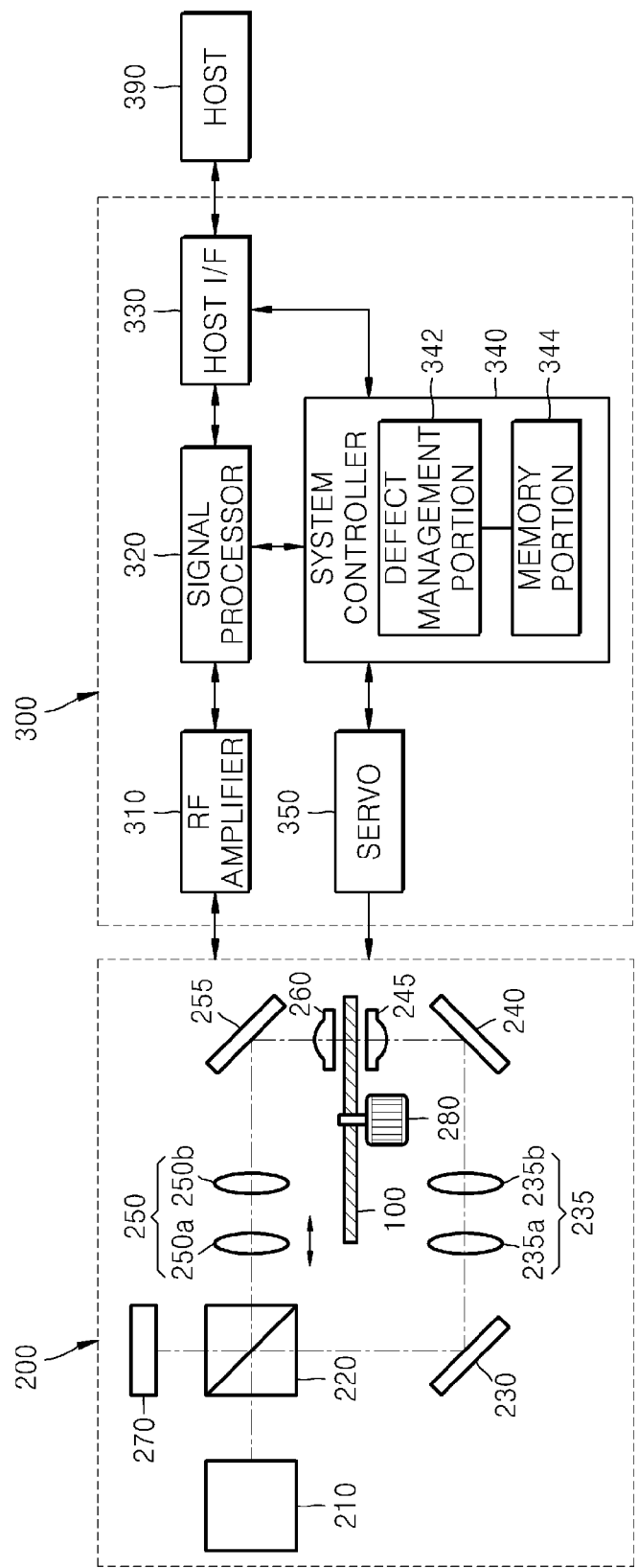
FIG. 3 is a block diagram showing the structure of a holographic information recording/reproducing apparatus according to an example embodiment of the present invention.

FIG. 3 is a block diagram showing the structure of a holographic information recording/reproducing apparatus according to an embodiment of the present invention. Referring to FIG. 3, the holographic information recording/reproducing apparatus according to an aspect of the present embodiment records and/or reproduces information onto/from a holographic information storage medium 100 and includes a recording/reproducing portion 200 and a control portion 300.

The recording/reproducing portion 200 records information on the holographic information storage medium 100 and reproduces recorded information under the control of the control portion 300. The recording/reproducing portion 200 includes a light source 210 that is an optical system for emitting light to the holographic information storage medium 100 and receiving reflected light, a beam splitter 220, first and second relay lens units 235 and 250, first and second objective lenses 245 and 260, a spindle motor 280 driving the holographic information storage medium 100, and a drive unit (not shown) driving the optical system. The light source 210 emits light for recording/reproducing information on the holographic information storage medium 100. The beam splitter 220 splits the light output from the light source 210 into a reference light and a signal light and also changes a proceeding path of the light reflected by the holographic information storage medium 100 toward a photodetector 270. The first and second relay lens units 235 and 250 respectively include a plurality of lenses 235a and 235b and lenses 250a and 250b. At least one lens 235a or 250a moves in a direction along an optical axis, the first and second relay lens units 235 and 250 control the position of a focal point where the reference light and the signal light are formed on the holographic information storage medium 100. As the position of the focal point where the reference light and the signal light are formed is changed in a direction along the depth of the holographic information storage medium 100, information is written on the holographic information storage medium 100 in multiple information layers of the recording layer. In FIG. 3, mirrors 230, 240, and 255 are arranged to change the proceeding path of the light.

The control portion 300 controls the recording/reproducing portion 200 for recording/reproducing information and performs signal processing of the recorded information and reproduced information. In particular, the control portion 300 controls the inspection of a defect and also controls the recording/reproducing portion 200 to record a defect entry, with respect to inspected defective blocks, in an area of the holographic information storage medium 100. The control portion 300 includes an RF amplifier 310, a signal processor 320, a host I/F 330, a system controller 340, and a servo 350. A host 390 receives an information recording/reproducing command from a user and transmits the received command to the recording/reproducing portion 200 via the host I/F 330. The host I/F 330 is an apparatus for interfacing between the host 390 and the recording/reproducing portion 200. The system controller 340 controls the signal processor 320 and the servo 350 according to the recording/reproducing command from the host 390. The signal processor 320 encodes data to be recorded on the holographic information storage medium 100 that is received from the host I/F 330 and decodes the data read from the holographic information storage medium 100 during reproduction. The RF amplifier 310 converts the data output from the signal processor 320 to an RF signal and transmits the converted signal to the recording/reproducing portion 200 during recording, and converts the optical signal detected from the holographic information storage medium 100 to an RF signal and provides modulated data obtained from the RF signal to the signal processor 320 during reproduction. Also, the RF amplifier 310 provides a servo signal for control of the recording/reproducing portion 200 that is obtained from the RF signal to the servo 350 via the system controller 340. The servo 350 receives a command needed for servo control from the system controller 340 and performs a servo control of the recording/reproducing portion 200.

In particular, the system controller 340 includes a defect management portion 342 and a memory portion 344 to perform defect inspection. For example, after a defect inspection on a reference information layer of the holographic information storage medium 100 is completed, the defect management portion 342 of the system controller 340 determines from a defective block found from the inspection whether there is a defect in the other information layers, generates defect information, and stores the generated defect information in the memory portion 344. The defect information can be used when recording and/or reproducing information onto/from the other information layers. Furthermore, the system controller 340 controls the recording/reproducing portion 200 to record a defect entry, including the defective block position information of the reference information layer stored in the memory portion 344 and information on defective blocks or suspicious defective blocks in the other information layers determined based on the defective block position information of the reference information layer, in a predetermined area of the holographic information storage medium 100. The defect inspection process or the defect entry will be described in detail later.

Figure 4:
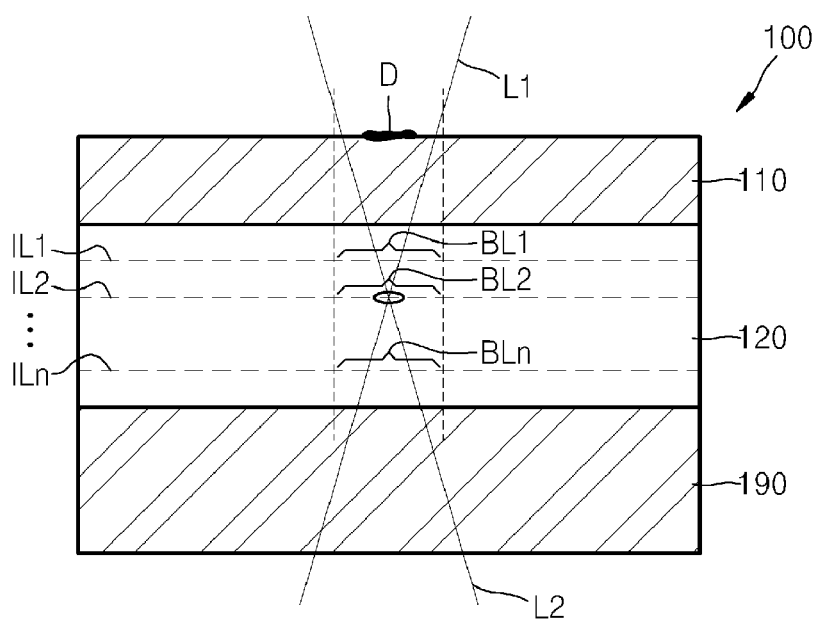
FIG. 4 illustrates a relationship between a defective block of a reference information layer and other information layers in a holographic information storage medium according to an example embodiment of the present invention.

FIG. 4 illustrates a relationship between a defective block of a reference information layer and other information layers in a holographic information storage medium according to an embodiment of the present invention. Referring to FIG. 4, the holographic information storage medium 100 includes a recording layer 120 formed of a photosensitive material where information can be recorded using holography and first and second protective layers 110 and 190 covering both surfaces of the recording layer 120. The holographic information storage medium 100 is a dual side incident type holographic information storage medium in which a reference light L1 and a signal light L2 are input from both of the first and second protective layers 110 and 190 during recording and is a single side incident type holographic information storage medium in which the reference light L1 and the signal light L2 are input from only one of the first and second protective layers 110 and 190 during recording. In the dual side incident type holographic information storage medium, the first and second protective layers 110 and 190 are both formed of a transparent medium and a defect factor D can occur on both of the first and second protective layers 110 and 190. In FIG. 4, in the holographic information storage medium 100 of the dual side incident type, the defect factor D occurs at the first protective layer 110. In the single side incident type, for example, when light is input through the first protective layer 110, a reflection layer (not shown) can be further provided between the recording layer 120 and the second protective layer 190 and the defect factor D can occur on the first protective layer 110.

The holographic information storage medium 100 according to the present embodiment can be formed by a micro-holographic method in which a hologram generated by the interference between the reference light L1 and the signal light L2 contains one-bit information. In the micro-holographic method, a plurality of information layers IL1, IL2, . . . ILn can be formed on the recording layer 120 by forming a plurality of holograms.

The defect factor D can be caused by dust, fingerprints, and scratches on the surface of the holographic information storage medium 100. For the holographic information storage medium 100 of a micro-holographic method for writing information in multiple layers, the defect factor D can affect all of the information layers IL1, IL2, . . . , ILn. When the defect factor D occurs on the first protective layer 110 and the light for recording/reproducing is illuminated on a position of the defect factor D in a direction perpendicular to the surface of the holographic information storage medium 100, light affected by the defect factor D affects the information layers IL1, IL2, ..., ILn. As a result, it is highly likely that defects are generated in an area located in a direction perpendicular to the position where the defect factor D is located on the first protective layer 110 and blocks BL1, BL2, ..., BLn at corresponding positions of the plurality of information layers are determined as defective blocks.

A layer most susceptible to the defect factor D among the information layers IL1, IL2, ..., ILn is set as the reference information layer and the defectiveness of the other layers can be determined based on the reference information layer. In the single side incident type holographic information storage medium in which the reference light and the signal light are incident on the same surface, the reference information layer can be a layer closest to an incident surface of the information layers, where light is incident. Also, in the dual side incident type holographic information storage medium in which the reference light and the signal light are incident on different surfaces of a medium, the reference information layer can be a layer closest to any of both sides of the medium or a layer closest to either side. The reference information layer, is chosen because the reference information layer is most highly likely to be affected by the defect factor D. However, the reference information layer is not limited thereto. The layer most susceptible to the defect factor D can be differently set by a variety of optical variants such as the thicknesses of the first and second protective layers 110 and 190 or the thickness of the recording layer 120, the interval between the information layers IL1, IL2, ..., ILn, the refractivity of the first and second protective layers 110 and 190, or the size of a recording mark.

In the present embodiment, a case of setting the first information layer IL1 as the reference information layer is described. When a first block BL1 of the first information layer IL1 that is the reference information layer is determined as a defective block, blocks BL2, ..., BLn of the other information layers IL2, ..., ILn located in a direction perpendicular to the surface of the holographic information storage medium 100 from the position where the first block BL1 is located are determined as defective blocks or regarded as suspicious defective blocks. As the blocks BL2, ..., BLn of the other information layers IL2, ..., ILn located in a direction perpendicular to the surface of the holographic information storage medium 100 from the position where the first block BL1 is located are determined as defective blocks, the defect inspection on the other information layers IL2, ..., ILn can be omitted or simplified thus reducing initialization time for defect inspection.

Figure 5:
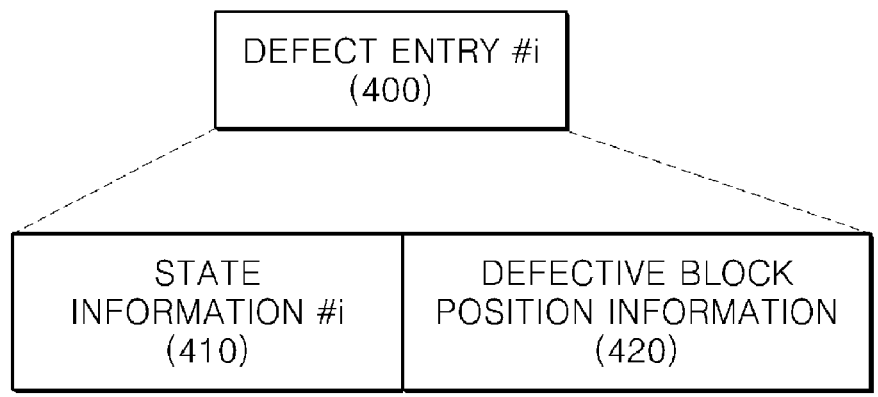
FIG. 5 illustrates the data structure of a defect entry according to a holographic information recording/reproducing apparatus according to an example embodiment of the present invention.
Figure 6:
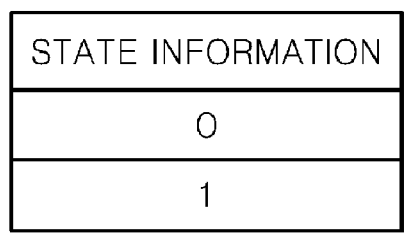
FIG. 6 illustrates a detailed data structure of the state information of FIG. 5.

FIG. 5 illustrates the data structure of a defect entry according to a holographic information recording/reproducing apparatus according to an embodiment of the present invention. FIG. 6 illustrates a detailed data structure of the state information of FIG. 5.

The holographic information recording/reproducing apparatus inspects for a defect of the reference information layer of the holographic information storage medium 100 and writes a defect list of the defect information on the reference information layer and the defect information about the other information layers related thereto. The defect list is recorded in a defect management area provided in a predetermined area of the holographic information storage medium 100 and prevents a recording/reproducing error due to a defect. The defect list may include a plurality of defect entries and FIG. 5 shows a defect entry #i 400 that is the $i^{th}$ entry. The defect entry #i 400 includes a state information #i 410 and a defect block position information 420. The defect block position information 420 is information on the position of a defective block, for example, BL1 of FIG. 4, determined from the inspection of the reference information layer. The state information #i 410 contains information on whether blocks of the other information layers located at a position corresponding to the defective block position information 420 in the direction perpendicular to the surface of the holographic information storage medium 100 are defective blocks or not. In the following description, blocks of the other information layers located in the perpendicular direction from the position where the defective block of the reference information layer exists are referred to as related blocks. The related blocks may be blocks through which the recording/reproducing light of the defective block of the reference information layer passes.

The state information #i 410, for example, indicates that all related blocks of the other information layers except for the reference information layer are defective blocks or not defective blocks. For example, referring to FIG. 6, the state information "1" indicates that all related blocks of the other information layers are defective blocks and the state information "0" indicates that all related blocks of the other information layers are not defective blocks. Thus, since the defect information of the other information layers is determined based on the defect information of the reference information layer, the defect inspection on the other information layers can be omitted.

As a modified example of the present embodiment, the state information #i 410, for example, can indicate whether alt related blocks of the other information layers except for the reference information layer are likely to be defective blocks. For example, in FIG. 6, the state information "1" indicates that all related blocks of the other information layers are likely to be defective blocks, and the state information "0" indicates that all related blocks of the other information layers are not likely to be defective blocks or there is no defect information on the related blocks of the other information layers. When all related blocks of the other information layers are likely to be defective blocks, the defect inspection can be performed for the related blocks only.

Figures 7, 8:
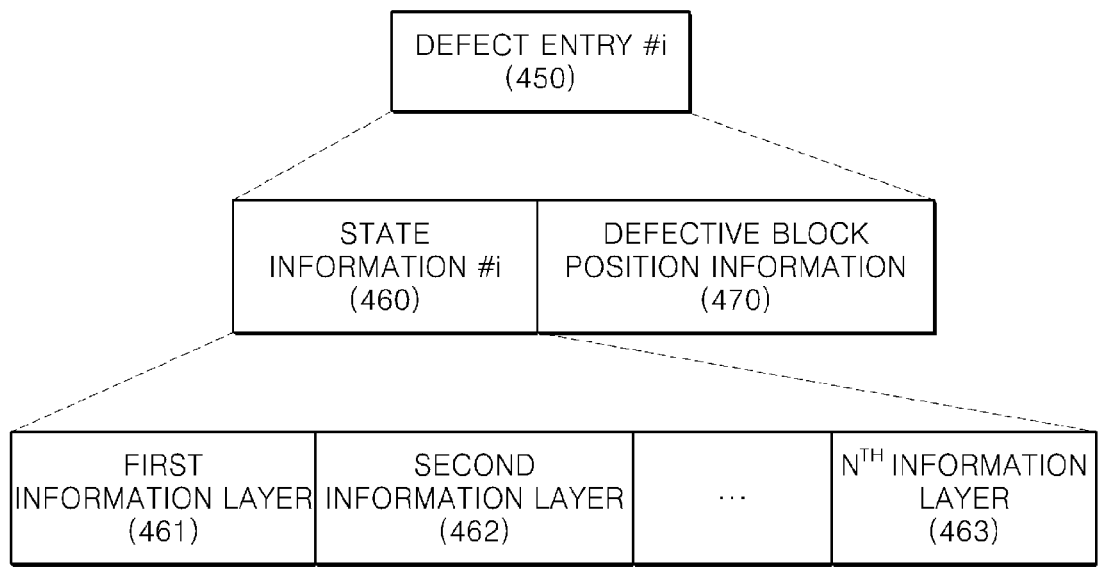
FIG. 7 illustrates the data structure of a defect entry according to a holographic information recording/reproducing apparatus according to another example embodiment of the present invention.
FIG. 8 illustrates a detailed data structure of the state information of FIG. 7.

FIG. 7 illustrates the data structure of a defect entry according to a holographic information recording/reproducing apparatus according to another embodiment of the present invention. FIG. 8 illustrates a detailed data structure of the state information of FIG. 7.

Referring to FIG. 7, a defect entry #i 450 includes a state information #i 460 and a defective block position information 470. The defective block position information 470 is information on a defective block, for example BL1 of FIG. 4, inspected from the reference information layer. The state information #i 460 contains defect information on each of first, second, ..., and $n^{th}$ information layers 461, 462, ..., and 463 corresponding to the defective block position information 470. For example, when the first information layer 461 is the reference information layer, the state information #i 460 contains defect information of a block corresponding to the defective block position information 470 in the first information layer 461 and blocks, that is, the related blocks, located adjacent to the perpendicular direction of the defective block position information 470 in the other information layers that are the second through $n^{th}$ information layers 462 and 463.

The state information #i 460, for example, indicates whether the related blocks of the other information layers are defective blocks or not. Referring to FIG. 8, the number of digits in a numerical row stored in the state information corresponds to the number of the information layers. In the numerical rows of "1000 ... 000" and "1100 ... 000", the digit "1" or "0" of one bit contains information on a corresponding block of each information layer. For example, when the state information is "1000 . . . 000", the digit "1" assigned to the information on the corresponding block of the first information layer indicates that the corresponding block of the first information layer is a defective block. The digit "0" assigned to the information on the corresponding block of each of the other information layers indicates that each block is not a defective block. In another example, when the state information is "1111 . . . 111", the corresponding blocks of all information layers are defective blocks.

As a modified example of the present embodiment, the state information #i 460, for example, can indicate whether a block of each information layer located in the perpendicular direction at the position corresponding to the defective block position information 470 is likely to be a defective block. For example, in FIG. 8, the state information "1" indicates that the related block of the corresponding information layer is likely to be a defective block, and the state information "0" indicates that a related block of the corresponding information layer is not likely to be a defective block or there is no defect information on the related block. When the related block is likely to be a defective block, the defect inspection can be performed again in the recording process or data is not allowed to be recorded.

FIG. 9 is a flow chart for explaining the process of a method for inspecting a defect of a holographic information storage medium according to an embodiment of the present invention. Referring to FIG. 9, when a holographic information recording/reproducing apparatus receives a recording command from a host, a reference information layer (S500) is first inspected for a defect. When a defect is not found in the reference information layer, the defect inspection is completed. When a defect is found in the reference information layer, a block, that is a recording/reproducing unit, at the position where the defect is found is determined as a defective block (S510). When a defective block is found in the reference information layer as above, related blocks of the other information layers located in the perpendicular direction at the position of the defective block of the reference information layer is determined as defective blocks or suspicious defective blocks (S520). Then, a defect entry including position information of the block of the reference information layer where the defect is found and state information on the related blocks of the other information layers is written (S530). By performing the defect inspection as above, the holographic information recording/reproducing apparatus can more rapidly move to the subsequent recording/reproducing operations.

The defect inspection method can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for accomplishing an aspect of the present invention can be easily construed by programmers skilled in the art to which the present invention pertains.

While there have been illustrated and described what are considered to be example embodiments of the present invention, it will be understood by those skilled in the art and as technology develops that various changes and modifications, may be made, and equivalents may be substituted for elements thereof without departing from the true scope of the present invention. Many modifications, permutations, additions and sub-combinations may be made to adapt the teachings of the present invention to a particular situation without departing from the scope thereof. Accordingly, it is intended, therefore, that the present invention not be limited to the various example embodiments disclosed, but that the present invention includes all embodiments falling within the scope of the appended claims.

What is claimed is:

1. A holographic information storage medium comprising:
a plurality of information layers in which information is recorded as holograms created by an interference between a reference light and a signal light;
wherein a defect entry is recorded in the holographic information storage medium, the defect entry comprising:
position information of a defective block of a reference information layer of the information layers; and
state information indicating a defective state of blocks of other ones of the information layers that are not the reference information layer located in a direction perpendicular to the defective block of the reference information layer;
the holographic information storage medium is a dual side incident type holographic information storage medium in which the reference light is incident on a first side of the holographic information storage medium, and the signal light is incident on a second side of the holographic information storage medium; and
either (1) there is only one reference information layer, which is one of the information layers that is closest to either the first side of the holographic information storage medium or the second side of the holographic information storage medium, or (2) there are two reference information layers comprising a first reference information layer, which is one of the information layers that is closest to the first side of the holographic information storage medium, and a second reference information layer, which is another one of the information layers that is closest to the second side of the holographic information storage medium.

2. The holographic information storage medium of claim 1, wherein the blocks of the other information layers located in the direction perpendicular to the defective block of the reference information layer are blocks through which light for recording/reproducing the defective block of the reference information layer passes.

3. The holographic information storage medium of claim 1, wherein the state information indicates whether the blocks of the other information layers located in the direction perpendicular to the defective block of the reference information layer are defective blocks or not.

4. The holographic information storage medium of claim 1, wherein the state information indicates whether the blocks of the other information layers located in the direction perpendicular to the defective block of the reference information layer are likely to be defective blocks.

5. The holographic information storage medium of claim 3, wherein the state information indicates the defective state of all of the blocks of the other information layers located in the direction perpendicular to the defective block of the reference information layer.

6. The holographic information storage medium of claim 3, wherein the state information indicates the defective state of each of the blocks of the other information layers located in the direction perpendicular to the defective block of the reference information layer.

7. The holographic information storage medium of claim 1, wherein the reference information layer is one of the information layers that is most susceptible to a defect factor.

8. A defect inspection apparatus for recording information in and/or reproducing information from a holographic information storage medium comprising a plurality of information layers in which information is recorded as holograms created by an interference between a reference light and a signal light, the defect inspection apparatus comprising:
a control portion to:
inspect a reference information layer of the information layers to determine whether blocks in the reference information layer are defective blocks; and
determine whether blocks in other ones of the information layers that are not the reference information layer located in a direction perpendicular to defective blocks of the reference information layer are defective blocks;
wherein the holographic information storage medium is a dual side incident type holographic information storage medium in which the reference light is incident on a first side of the holographic information storage medium, and the signal light is incident on a second side of the holographic information storage medium; and
either (1) there is only one reference information layer, which is one of the information layers that is closest to either the first side of the holographic information storage medium or the second side of the holographic information storage medium, or (2) there are two reference information layers comprising a first reference information layer, which is one of the information layers that is closest to the first side of the holographic information storage medium, and a second reference information layer, which is another one of the information layers that is closest to the second side of the holographic information storage medium.

9. The defect inspection apparatus of claim 8, wherein the control portion determines whether the blocks of the other information layers located in the direction perpendicular to the defective blocks of the reference information layer are defective blocks based on the inspection of the reference information layer.

10. The defect inspection apparatus of claim 8, wherein the control portion determines whether the blocks of the other information layers located in the direction perpendicular to the defective blocks of the reference information layer are suspicious defective blocks based on the inspection of the reference information layer.

11. The defect inspection apparatus of claim 8, further comprising a recording/reproducing portion;
wherein the control portion controls the recording/reproducing portion to record a defect entry in an area of the holographic information storage medium, the defect entry comprising:
a position information field comprising position information of a defective block of the reference information layer; and
a state information field comprising state information indicating a defective state of blocks of the other information layers located in the direction perpendicular to the defective block of the reference information layer.

12. The defect inspection apparatus of claim 11, wherein the control portion controls the recording/reproducing portion to record state information indicating the defective state of all of the blocks of the other information layers located in the direction perpendicular to the defective block of the reference information layer in the state information field.

13. The defect inspection apparatus of claim 11, wherein the control portion controls the recording/reproducing portion to record state information indicating the defective state of each of the blocks of the other information layers located in the direction perpendicular to the defective block of the reference information layer in the state information field.

14. A method for inspecting defects in a holographic information storage medium, the holographic information storage medium comprising a plurality of information layers in which information is recorded as holograms created by an interference between a reference light and a signal light, the method comprising:
inspecting a reference information layer of the information layers to determine whether blocks of the reference information layer are defective blocks; and
determining whether blocks of other ones of the information layers that are not the reference information layer located in a direction perpendicular to a defective block of the reference information layer are defective blocks based on the inspecting of the reference information layer;
wherein the holographic information storage medium is a dual side incident type holographic information storage medium in which the reference light is incident on a first side of the holographic information storage medium, and the signal light is incident on a second side of the holographic information storage medium; and
either (1) there is only one reference information layer, which is one of the information layers that is closest to either the first side of the holographic information storage medium or the second side of the holographic information storage medium, or (2) there are two reference information layers comprising a first reference information layer, which is one of the information layers that is closest to the first side of the holographic information storage medium, and a second reference information layer, which is another one of the information layers that is closest to the second side of the holographic information storage medium.

15. The method of claim 14, wherein the blocks of the other information layers located in the direction perpendicular to the defective block of the reference information layer are blocks through which light for recording/reproducing the defective block of the reference information layer passes.

16. The method of claim 14, wherein the determining of whether blocks of the other information layers are defective blocks comprises determining that the blocks of the other information layers located in the direction perpendicular to the defective block of the reference information layer are defective blocks based on a determination in the inspecting of the reference information layer that the defective block of the reference information layer is a defective block.

17. The method of claim 14, wherein the determining of whether blocks of the other information are defective blocks comprises determining that the blocks of the other information layers located in the direction perpendicular to the defective block of the reference information layer are suspicious defective blocks based on a determination in the inspecting of the reference information layer that the defective block of the reference information layer is a defective block.

18. The method of claim 14, further comprising recording a defect entry in an area of the holographic information storage medium, the defect entry comprising:

a position information field comprising position information of a defective block of the reference information layer; and a state information field comprising state information indicating a defective state of the blocks of the other information layers located in the direction perpendicular to the defective block of the reference information layer.

19. The method of claim 14, wherein the reference information layer is one of the information layers that is most susceptible to a defect factor.

20. A holographic information storage medium comprising:

a first protective layer;

a second protective layer; and a plurality of information layers in which information is recorded as holograms created by an interference between a reference light and a signal light, the information layers being disposed between the first protective layer and the second protective layer so that the first protective layer and the second protective layer cover the information layers;

wherein a defect entry is recorded in the holographic information storage medium, the defect entry comprising:

position information of a defective block of a reference information layer of the information layers; and state information indicating a defective state of blocks of other ones of the information layers that are not the reference information layer located in a direction perpendicular to the defective block of the reference information layer;

the holographic information storage medium is a dual side incident type holographic information storage medium in which the reference light is incident on a first side of the holographic information storage medium, and the signal light is incident on a second side of the holographic information storage medium; and either (1) there is only one reference information layer, which is one of the information layers that is closest to either the first side of the holographic information storage medium or the second side of the holographic information storage medium, or (2) there are two reference information layers comprising a first reference information layer, which is one of the information layers that is closest to the first side of the holographic information storage medium, and a second reference information layer, which is another one of the information layers that is closest to the second side of the holographic information storage medium.

21. The holographic information storage medium of claim 20, wherein the state information indicates whether a block of one of the other information layers located in the direction perpendicular to the defective block of the reference information layer is a defective block or not.

22. The holographic information storage medium of claim 20, wherein the state information indicates the defective state of all of the blocks of the other information layers located in the direction perpendicular to the defective block of the reference information layer.

23. The holographic information storage medium of claim 20, wherein the state information indicates whether a block of one of the other information layers located in the direction perpendicular to the defective block of the reference information layer is likely to be a defective block.

* * * * *